United States Patent [19]

Crawley

[11] 4,372,341
[45] Feb. 8, 1983

[54] ROTARY SWITCH VALVE

[75] Inventor: Harry D. Crawley, Winnipeg, Canada

[73] Assignee: Versatile Cornat Corporation, Vancouver, Canada

[21] Appl. No.: 154,078

[22] Filed: May 28, 1980

[51] Int. Cl.³ .......................................... F16K 11/00
[52] U.S. Cl. .................................. 137/580; 91/448; 137/554; 137/625.43; 137/625.46; 180/329
[58] Field of Search ............... 180/326, 329, 330, 331; 91/448, 467; 137/554, 580, 625.21, 625.43, 625.46

[56] References Cited

U.S. PATENT DOCUMENTS

| | | | |
|---|---|---|---|
| 2,344,913 | 3/1944 | Ager | 137/625.43 X |
| 3,132,486 | 5/1964 | Jonkers et al. | 180/329 X |
| 3,705,707 | 12/1972 | Scaramucci | 251/174 X |
| 3,891,003 | 6/1975 | Duttarer et al. | 180/329 X |
| 4,059,171 | 11/1971 | Pakosh | 180/328 |

FOREIGN PATENT DOCUMENTS 2347547  4/1975  Fed. Rep. of Germany ...... 180/327

*Primary Examiner*—Gerald A. Michalsky
*Attorney, Agent, or Firm*—Wenderoth, Lind & Ponack

[57] ABSTRACT

A rotary switch valve, particularly for use in a vehicle where the operator may wish to face in either direction such as on a tractor where implements or attachments may be mounted on either the front or rear ends. The valve consists of at least two passageways for allowing passage of hydraulic fluid, which passageways pass through both a casing and a spool, relative rotational movement being allowed between them. Upon 180° relative rotational movement, the passageways feed fluid from the outlet ports in a sense opposite to that when the spool and casing were in their original positions. The steering system of the vehicle, therefore, will continue to direct the vehicle in its normal sense.

2 Claims, 6 Drawing Figures

ROTARY SWITCH VALVE

INTRODUCTION

This invention relates to a valve used in a hydraulic circuit and, particularly, to a hydraulic circuit for use in the steering system of a tractor which has a reversible steering console.

BACKGROUND OF THE INVENTION

There is disclosed in Canadian Pat. No. 1,035,390 (Pakosh), a reversible steering console for use on a tractor. A reversible steering console on a tractor and, particularly, on a tractor which may be used for several different purposes is useful because both the front and rear ends of the tractor may be used and the operator has better observation and control of the operating mechanism or implement which is being used.

As the console is reversed, however, the steering controls are also reversed and, without some provision to reverse the flow of hydraulic fluid in the hydraulic lines, the steering would cause movement of the tractor opposite to that intended by the operator in the original position. Further, the attachments to allow flow between the hydraulic pump and the steering valve are hydraulic hoses which are susceptible to twisting and wear when the console is rotated.

SUMMARY OF THE INVENTION

In accordance with the invention, there is disclosed a rotary switch valve rotatable through 180° from a first to a second operating position re-directing the flow of hydraulic fluid in a hydraulic system, said switch valve comprising:

(a) a casing, said casing having an interface and an outer surface;

(b) a spool, said spool having an interface and outer surface, said spool being mounted with said spool interface adjacent and opposed to said casing interface, said spool being rotatable relative to said casing about a common longitudinal central axis;

(c) said casing and said spool having a cavity located between the respective interfaces;

(d) each of said spool and said casing having pressure, tank, left steering and right steering passageways therein, each of said passageways running from said respective outer surface; said left and right steering passageways of said spool and casing at said respective interface being symmetrical about said axis, said left and right steering passageways in said casing interface being aligned with said left and right steering passageways in said opposed cavity spool interface, respectively, when said valve is in said first operating position;

(e) inserts with substantially flat end faces on one end, the opposite ends of said inserts being inserted in said pressure and said left and right steering passageways in one of said spool and casing interfaces, each of said inserts having a shoulder within said cavity and a pressure producing washer mounted between said shoulder and said interface in which said inserts are inserted, said flat end faces exerting a pressure on and contacting the opposed interface;

(f) said left and right steering passageways of said spool at said spool interface being aligned with said right and left steering passageways of said cavity at said cavity interface, respectively, when said spool is rotated through substantially 180° relative to said casing to said second operating position.

BRIEF DESCRIPTION OF THE SEVERAL VIEWS OF THE DRAWINGS

In drawings, which illustrate an embodiment of the invention.

DESCRIPTION OF SPECIFIC EMBODIMENT

Figure 1:
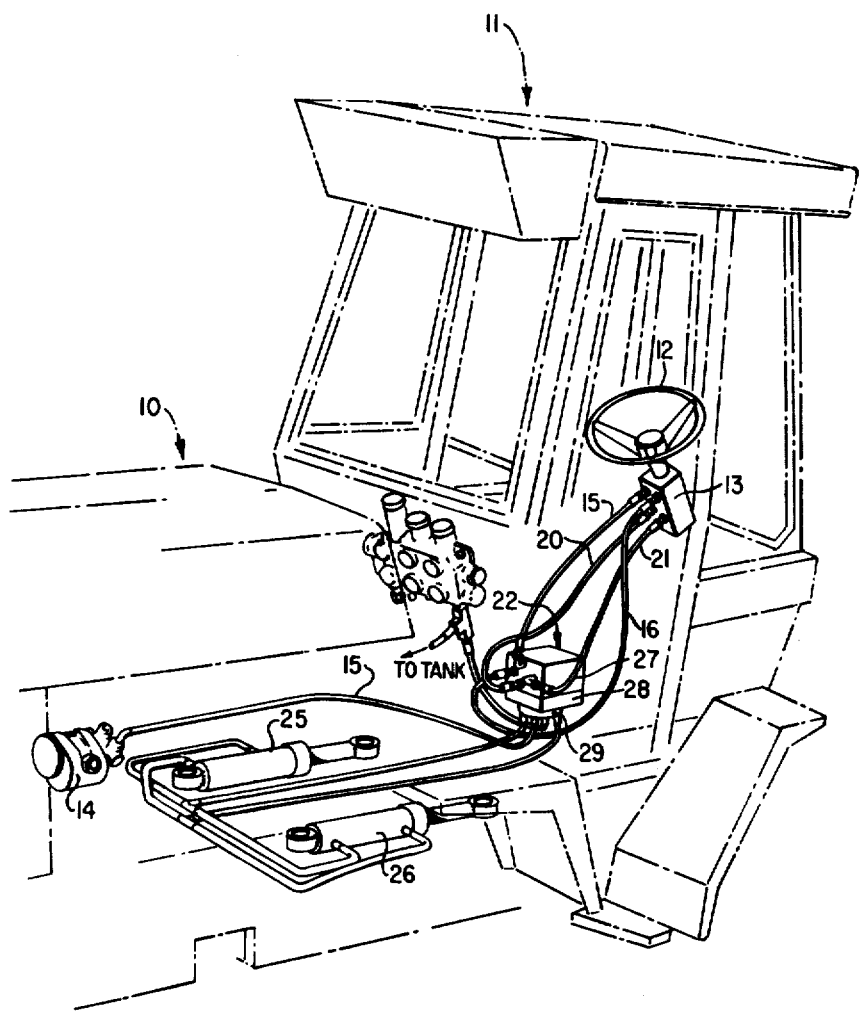
FIG. 1 is a schematic view of the hydraulic steering circuit of an agricultural tractor, which system incorporates the rotary switch valve of the present invention.

Referring to FIG. 1, the cab portion of a tractor 10 is shown in phantom lines generally at 11. The operator's console within the cab 11 is designed to be rotated 180° from a forward position to a rearwardly (as shown) facing position. A steering wheel 12 within the cab 11 is rotatably connected to a steering valve 13.

A hydraulic pump 14 provides the necessary pressure and flow, in combination, for the hydraulic circuit and pressure line 15 allows the fluid to pass from the pump 14 to one port of the rotary switch valve 22 and then to the steering valve 13. Return or tank line 16 allows fluid exit from a second or return port in steering valve 13 to the rotary switch valve 22 and then to the hydraulic storage tank (not shown) of the system. Steering valve 13 allows an appropriate amount of fluid to pass from the steering valve 13 through right or left hand hose assemblies 20,21, respectively, which carry fluid to rotary switch valve 22 and then to the respective right and left hydraulic steering cylinders 25,26.

Figure 2:
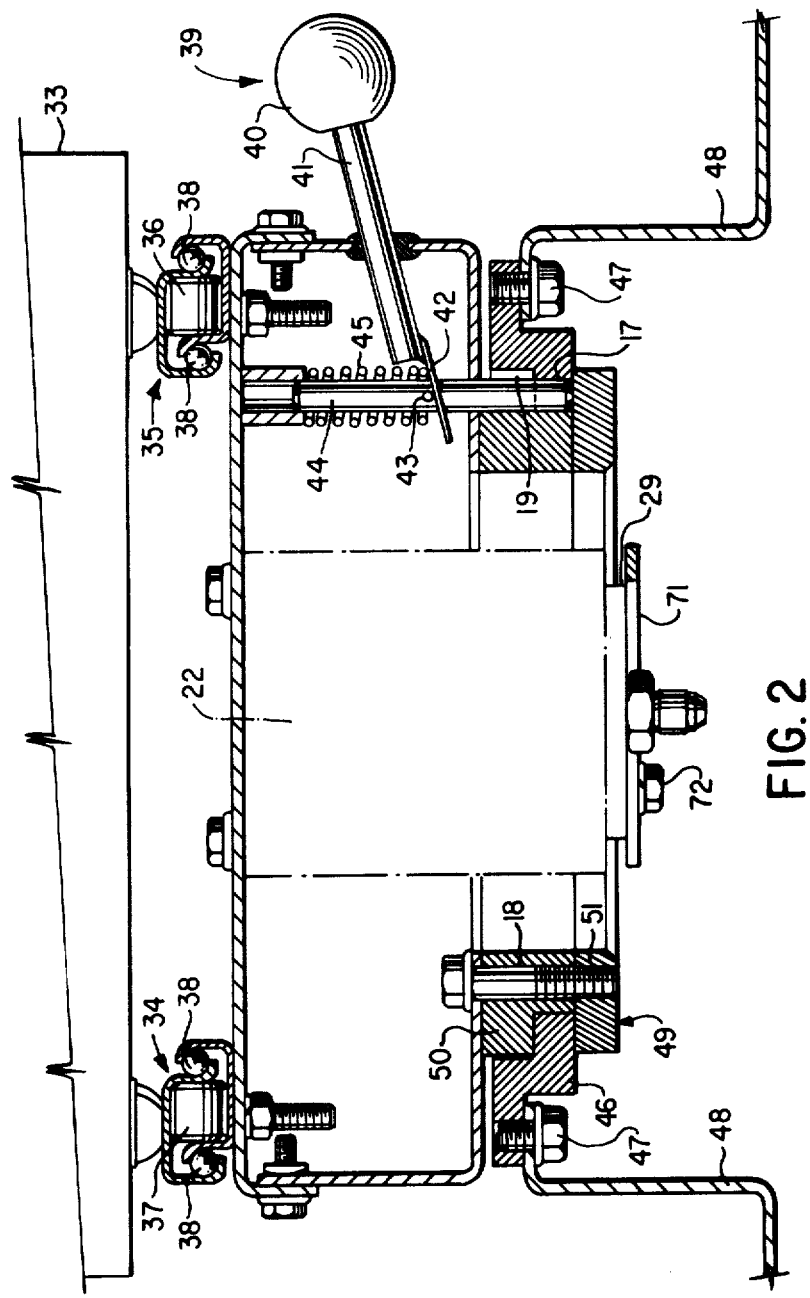
FIG. 2 depicts the outline of the rotary switch valve of the present invention and its relationship with the reversible steering console of the tractor.

Referring to FIG. 2, the rotary switch valve 22 is shown in phantom lines in its installed position. The tractor seat 33 of the steering console is shown supported at two positions by metal brackets 34,35. Longitudinal guides 36,37 are provided together with bearings 38 to allow fore and aft movement of the tractor seat 33.

A rotation lock shown generally at 39 comprises a ball handle 40 mounted on one end of an extending rod 41. An extension 42 of the rod 41 surrounds detent pin 44 and this extension is held in contact with keeper pin 43 which passes through the detent pin 44. Compression spring 45 imparts downward force on extension 42 and, consequently, detent pin 44.

A Z-shaped support frame 46 is rigidly connected by cap screws 47 to a supporting bracket 48 formed as a tunnel in the tractor floor. A ring 49 surrounds the support frame 46 and consists of an upper portion 50 and a lower portion 51. Two cylindrical bores 18 and 19 are machined in the upper portion 50 of the ring 49 at locations 180° from each other and one matching cylindrical bore 17 is machined in the Z-shaped support frame 46. The holes are adapted to receive the cylindrical detent pin 44 which passes through the upper portion 50 of the ring and the Z-shaped support frame 46 when the tractor seat 33 is in the operating position.

Figure 4:
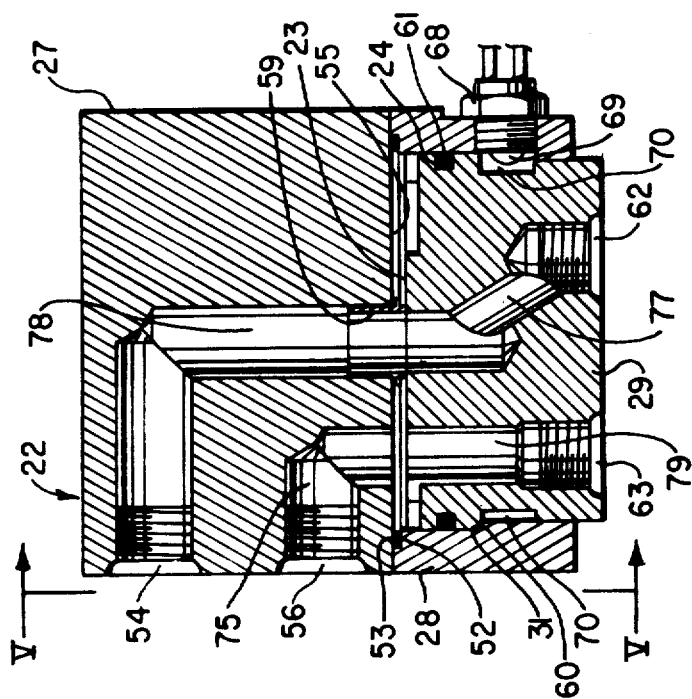
FIG. 4 is a sectional view of the rotary switch valve.
Figure 3:
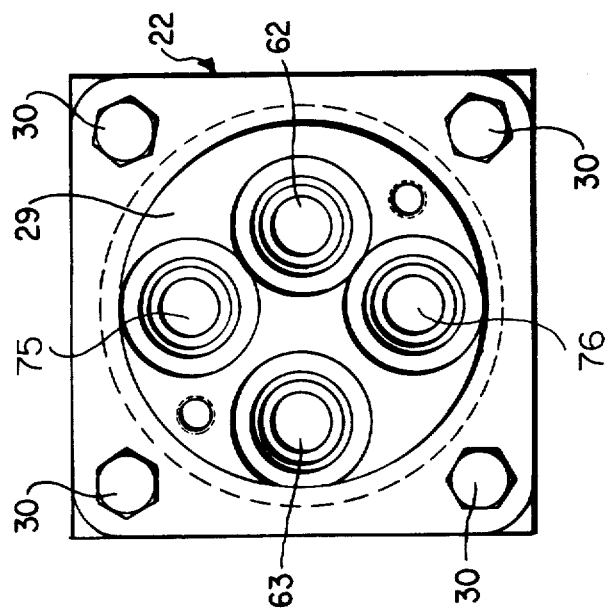
FIG. 3 is a view from the bottom of the rotary switch valve.

Referring now to FIGS. 3 and 4, the rotary switch valve 22 comprises an upper casing 27 made from machined aluminium and a lower steel base 28 connected to the upper casing 27 by bolts 30. A hole is machined through the base 28 and, as well, two shoulders or steps 31,52 of respectively greater diameters. A rubber O-ring 53 is positioned between the upper step 52 and the face 55 of the upper casing 27.

Figure 5:
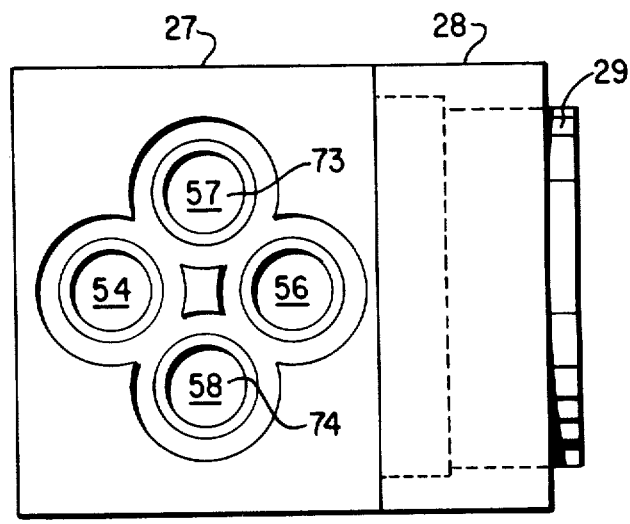
FIG. 5 is a view taken from the direction of line V—V of FIG. 4.

Four ports and connecting passageways are machined in the upper casing 27. The first or pressure port 54 extends from the outside of the upper casing 27 inwardly towards the axis of the switch valve and then centrally downwardly to face 55 as clearly shown in FIG. 4. A second or tank port 56 extends from below the pressure port also to the face 55 but outwardly from the axis, also as clearly seen in FIG. 4. Left and right steering ports 57 and 58 respectively, are to the right and left of the pressure and tank ports as shown in FIG. 5. They too extend inwardly and then downwardly to the face 55.

A lower member or spool 29 is machined to fit within the hole formed in the base 28 and to rotate relative thereto. A shoulder 60 formed on the spool 29 mates with the lower step 31 machined in the base 28 and this shoulder prevents downwardly axial movement of the spool 29 in the base 28. The face 23 of the spool 29 is designed to terminate slightly below the interface between the upper casing 27 and the base 28. Accordingly, a cavity is formed between the face 55 of the casing 27 and the face 23 of the spool 29. A groove 24 is machined in the spool 29 and is adapted for the insertion of a rubber O-ring 61 between the spool 29 and the base 28. To prevent rotation of the spool 29 when rotation of the tractor cab is desired, a bracket 71 is attached to the spool 29 by bolts 72 (only one of which is shown), the bracket 71 then being attached to supporting bracket 48 (FIG. 2).

Four passageways are also machined in the spool 29 and terminate in respective ports. As shown in FIG. 3, the passageways 75 and 76 are symmetrical with respect to a plane joining the pressure port 62 and the tank port 63. The left and right hand steering fluid passageways (now shown) are aligned with their corresponding left and right hand steering fluid passageways in the upper casing 27 in the initial operating position. When the spool 29 is rotated 180° from its initial position, the left and right hand steering fluid passageways in the casing 27 are then aligned with the right and left hand steering fluid passageways in the spool 29.

Bronze inserts or slippers 59 are inserted in the passageways of the pressure, left and right steering fluid ports 54,57 and 58 respectively. The slipper 59 in the pressure passageway 78 of the upper casing 27 is shown more clearly in FIG. 6. The slipper 59 is dimensioned to allow axial movement with respect to passageway 78. A shoulder 64 is formed on the slipper 59 to allow a wave washer 65 to be inserted between the shoulder 64 and the face 55 of the upper casing 27. This wave washer 65 allows a tension to be exerted downwardly on the face 23 of the spool 29 by the insert 59. A groove 66 is machined in the slipper 59 to allow for the insertion of a rubber O-ring 67.

Provision is made in the spool 29 and the base 28 for a safety switch 68 (FIG. 4). The safety switch 68 incorporates a ball detent 69 and complementary recesses 70 are machined in the spool 29 at 180° opposed positions on the periphery of the spool. The safety switch 68 acts to terminate fuel flow to the engine if the detent 69 is not in its extended position within the recess 70 or, if the engine is gasoline powered, it would act to cut off the ignition system.

Hydraulic lines are attached to their respective ports at the side of the upper casing 27 of the switch valve 22 and at the bottom of the spool 29 as best seen in FIG. 1.

OPERATION

Figure 6:
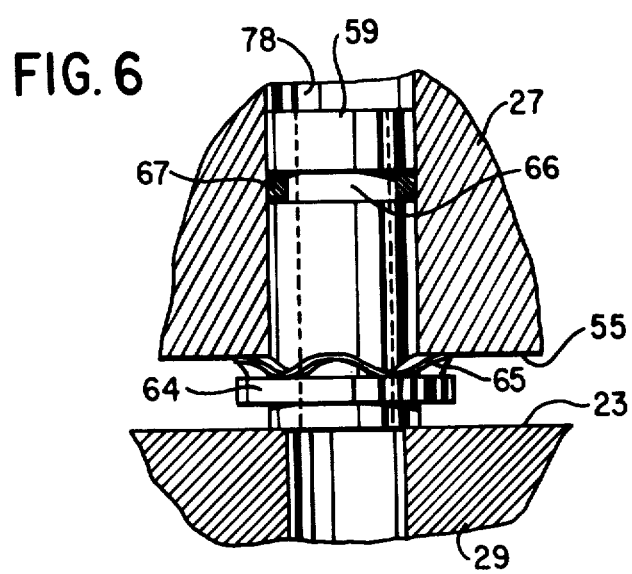
FIG. 6 is an enlarged view of the insert shown in FIG. 4.

In operation, with the steering console shown in its FIG. 1 position, hydraulic fluid passes from the hydraulic pump 14 through pressure line 15 to rotary switch valve 22 and then to steering valve 13. As seen from FIG. 4, the fluid will travel into pressure port 62, through spool passageway 77, slipper 59, casing passageway 78 and out casing pressure port 54. As best seen in FIG. 6, wave washer 65 causes a downwards pressure on the shoulder 64 of the slipper 59 which causes a strong contact between the slipper 59 and the face 23 of the spool 29. This contact allows fluid flow through the cavity without a significant amount of leakage thereto.

The hydraulic fluid will then be directed within the steering valve 13 in accordance with the rotation of the steering wheel 12. The correct amount of fluid will be apportioned to each of the steering cylinders 25,26. This fluid will pass through left and right hose assemblies 20,21 to the left and right steering input ports 73 and 74 of the casing 27 (FIG. 5), through the corresponding casing passageways (not shown), through the slippers in each passageway (similarly not shown), through the corresponding spool passageways and out their respective left and right spool outlet ports, through the appropriate hose assemblies to respective left and right hand steering assemblies 26,25. The slippers of the steering fluid passageways all act similarly to the slipper 59 shown in FIG. 6 and, accordingly, fluid flow through the cavity occurs for each of the steering passageways without a significant amount of leakage therefrom in the cavity area.

Fluid will also be directed by the steering valve 13 to the tank or return line 16 which enters the rotary switch valve 22 at the casing tank port 56. This fluid travels through its corresponding casing passageway 75 and is released into the cavity formed between the casing 27 and the spool 29. From the cavity, the fluid travels down through tank passageway 79 and tank outlet port 63 in spool 29, through its appropriate tank hose assembly 80 to the hydraulic fluid storage tank (not shown).

When the operator desires to face in a direction opposite his initial position, he exerts a downwards force on ball handle 40 (FIG. 2) which removes detent pin 44 from its engaged position in the stationary Z-shaped support frame 46 and the upper portion 50 of the ring 49. This removal allows the ring 49 together with the operator's chair 33, the steering wheel 12 (FIG. 1), the casing 27 and the base 28 of rotary switch valve 22 to rotate as an assembly in a counter-clockwise position when viewed from above. As described, the spool 29 is prevented from rotating by bracket 71.

The slippers of the left and right casing steering passageways (not shown), corresponding to the input ports 73 and 74 respectively, and the slipper 59 of the casing pressure passageway 78 will slide smoothly on the face 23 of the spool 29. When the assembly reaches a position 180° removed from its initial position, a stop (not shown) terminates rotation. The detent pin 44 (FIG. 2) will drop into its extended retaining condition thus locking the assembly in its new position.

As the casing 27 and base 28 of rotary switch valve 22 rotate and with reference to FIG. 4, ball detent 69 of safety switch 68 will no longer remain in its fully extended position because it will have moved out of complementary recess 70. This will initiate action of the safety switch which shuts off fuel flow to the engine if the engine has not been previously stopped.

In the oppositely opposed position, the ball detent 69 (FIG. 4) of the safety switch 68 will again be accommodated by the opposed recess 70 and, since it is again in its extended position, fuel will be allowed to flow to the engine. The slippers of the steering fluid passageways (not shown) will allow the communication of fluid through the cavity between the steering fluid passageways of the casing 27 and the steering fluid passageways of the spool 29. However, whereas in its initial position, fluid would flow into casing ports 73 and 74 and out spool ports 75 and 76 respectively, fluid will now flow into casing ports 73 and 74 and out spool ports 76 and 75 respectively. As the operator rotates the steering wheel in its new position therefore, the tractor will be directed as the operator normally desires.

Accordingly, there has been described a novel rotary switch valve particularly for use in a vehicle where it may be desired to operate the vehicular steering apparatus while facing either end. It is emphasized, however, that the description herein is of a single embodiment which has been found particularly advantageous. Many changes may be made in the embodiment so described without departing from the spirit of the invention which should, therefore, only be limited by the scope of the accompanying claims.

The embodiments of the invention in which an exclusive property or privilege is claimed are defined as follows:

1. A rotary switch valve rotatable through 180° from a first to a second operating position re-directing the flow of hydraulic fluid in a hydraulic system, said switch valve comprising:
   (a) a casing, said casing having an interface and an outer surface;
   (b) a spool, said spool having an interface and outer surface, said spool being mounted with said spool interface adjacent and opposed to said casing interface, said spool being rotatable relative to said casing about a common longitudinal central axis;
   (c) said casing and said spool having a cavity located between the respective interfaces;
   (d) each of said spool and said casing having pressure, tank, left steering and right steering passageways therein, each of said passageways running from said respective outer surface; said left and right steering passageways of said spool and casing at said respective interface being symmetrical about said axis, said left and right steering passageways in said casing interface being aligned with said left and right steering passageways in said opposed cavity spool interface, respectively, when said valve is in said first operating position;
   (e) inserts with substantially flat end faces on one end, the opposite ends of said inserts being inserted in said pressure and said left and right steering passageways in one of said spool and casing interfaces, each of said inserts having a shoulder within said cavity and a pressure producing washer mounted between said shoulder and said interface in which said inserts are inserted, said flat end faces exerting a pressure on and contacting the opposed interface;
   (f) said left and right steering passageways of said spool at said spool interface being aligned with said right and left steering passageways of said cavity at said cavity interface, respectively, when said spool is rotated through substantially 180° relative to said casing to said second operating position.

2. A rotary switch valve as in claim 1 and further comprising a safety detent device to impart a signal indicating when said valve is in said first or second operating positions.

* * * * *